J. G. CALLAN.
COMBINED STEP AND GUIDE BEARING.
APPLICATION FILED JUNE 28, 1907.
1,041,426.
Patented Oct. 15, 1912.
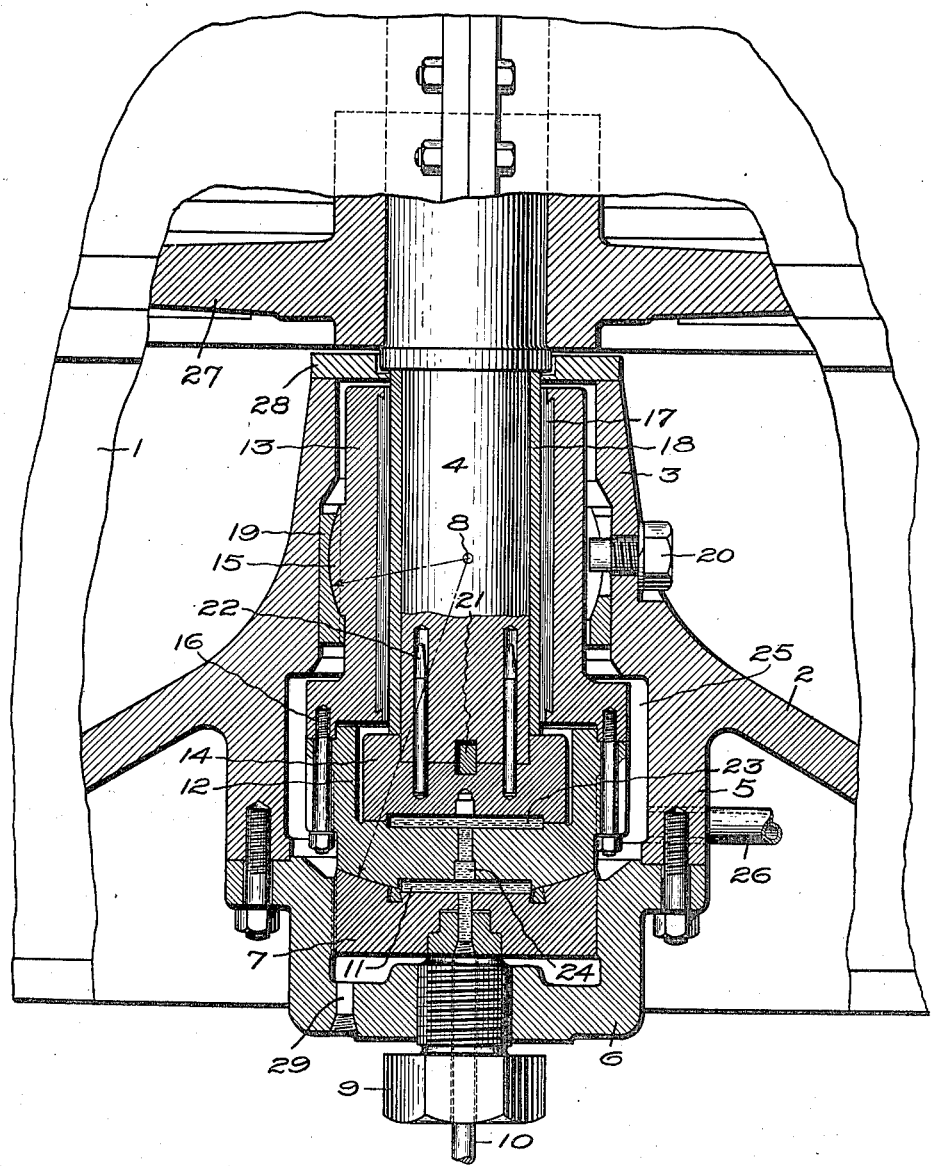
Witnesses:
Marcus L. Byng.
J. Ellis Glen.
Inventor,
John G. Callan
By Albert G. Davis
Att'y

UNITED STATES PATENT OFFICE.

JOHN G. CALLAN, OF NAHANT, MASSACHUSETTS, ASSIGNOR TO GENERAL ELECTRIC COMPANY, A CORPORATION OF NEW YORK.

COMBINED STEP AND GUIDE BEARING.

1,041,426.  Specification of Letters Patent.  Patented Oct. 15, 1912.

Application filed June 28, 1907. Serial No. 381,230.

*To all whom it may concern:*

Be it known that I, JOHN G. CALLAN, a citizen of the United States, residing at Nahant, county of Essex, State of Massachusetts, have invented certain new and useful Improvements in Combined Step and Guide Bearings, of which the following is a specification.

The present invention relates to self alining step and guide bearings for elastic fluid turbines and has for its object to improve their construction.

In the accompanying drawing is shown in vertical section one of the embodiments of my invention as applied to a vertical shaft turbine.

1 indicates the annular casing at the bottom of the machine having a base 2 which gradually rises from a point near the outer casing wall as it approaches the center and terminates in a housing 3 that is bored to receive the parallel guide bearing and the lower end of the turbine shaft 4. On the under side of the base is an annular projection 5 to which the head 6 is secured by bolts, the head being shouldered for the purpose of centering it, the parts 5 and 6 forming the lower portion of the housing which incloses the bearings.

The head is bored concentrically with the axis of the turbine to receive the adjusting block 7 forming the lower seat. The upper surface of the block forms a portion of a sphere whose center is indicated at 8. By preference the point 8 is located in the shaft axis mid-way between the upper and lower ends of the guide bearing although some departure measured up or down the axis will not seriously affect matters. The block is adjusted vertically by the screw 9 threaded in the head 6. Extending through the screw is a conduit 10 for discharging lubricant under pressure to the chamber 11 formed partly in the block and partly in the lower end of the holder immediately above it. The conduit may be supplied by a pump, accumulator, city water main if water is used as a lubricant, or other source of pressure.

The holder is made up of two principal parts or members 12 and 13. The part 12 is cup-shaped with its under surface forming a part of a sphere struck from the point 8. It is also provided with an opening, the bottom of which is flat and finished to act as a support for the upper flat surfaced step bearing block 14. The part 13 of the holder comprises a tubular portion having an enlargement 15 whose peripheral surface forms a part of a sphere struck from the point 8. It is also provided with an annular flange at its lower end to receive the bolts 16 that secure the parts. The said parts are shouldered at their meeting surfaces for the purpose of centering them and relieving the bolts of side strains. The inner surface of the tubular member is chambered out to receive the Babbitt lining 17 of the guide-bearing with which engages the sleeve 18 carried by the shaft. In the Babbitt lining are the usual vertically disposed grooves, the combined area of which plus that of the clearance between it and the sleeve around the shaft is sufficient to pass all of the lubricant from the step-bearing below. The spherical enlargement 15 is surrounded by a correspondingly shaped seat 19 that is split to permit of the parts being assembled. The periphery of the seat is cylindrical and snugly fits the bore of the housing 3. The seats 7 and 19 restrain the holder in planes perpendicular to each other and have a common center, *i. e.*, point 8. In order to prevent the holder and its seat 19 from rotating with the shaft, a screw 20 is provided which, however, permits the spherical surfaced seat to move up or down as the position of the adjusting screw 9 is changed. As shown, only a limited vertical adjustment is provided for the guide-bearing since that is all that is necessary for the particular use intended, but by making the cylindrical portion of the bore of the housing longer a greater range of adjustment can be provided.

On the lower end of the shaft is the upper block 14 of the step-bearing. The block and shaft are prevented from turning independently of each other by the key 21 and the pins 22, the latter also serving to direct the parts and therefore assist in assembling. Formed partly in the upper bearing block and partly in the lower member of the holder, which as will be noted, forms the lower bearing block, is a chamber 23 to which lubricant under pressure is admitted from the conduit 10 and chamber 11 by the passage 24. The relative areas of the chambers 11 and 23 and of the coöperating surfaces of the blocks are such that a certain amount of lubricant will flow between the supporting block 7 and the under side of the holder, but the major portion of the lubricant will flow through the chamber 23 and between the upper and lower blocks and maintain a constantly flowing film at all times. The lubricant exhausting from the bearing then passes upward through the guide-bearing and after lubricating it flows downward over the tubular portion of the holder and through passages in the spherical seat of the guide to the chamber 25 from which it is carried by the drain 26. The chamber and drain are common to the lubricant exhausting from the bearings and from the spherical support for the holder. It is evident that all of the bearing surfaces receive their lubricant from the same high pressure source, and also that the chamber between the thrust or supporting block and the holder and the chamber between the holder and the adjacent surfaces of the flat surfaced step-bearing discharge lubricant from said high pressure source in multiple, and that the exhaust or drain is common to all of the bearing surfaces. It is also evident from the above that owing to the spherical seats both the step and guide bearings are self adjusting; hence any distortion of the base 2 with respect to the shaft will not affect the alinement of the latter, because the bearings will gradually and automatically adjust themselves about the point 8 as the changes take place. The same is true if the position of the shaft changes without the base 2 undergoing any change.

It is to be noted that the positions of the bearings can be changed in a vertical direction and at the same time the concentric relation of the spherical seats of the parts preserved. This is an important feature since it enables me to adjust the position of the bucket wheel 27 with respect to the stationary buckets or nozzles or both. To state the matter in a different way, the step-and-guide-bearings are permanently fastened together and therefore can be treated as a unit which can be moved up or down as occasion demands without in any way interfering with their capacity for self alining. The top of the housing is provided with a cover 28 to prevent the exhaust steam from the wheel from entering it. In the head 6 is a passage 29 for drawing off any lubricant that leaks around the block 7 into the chamber below it.
With my improved construction the base 2 can be distorted by heat or otherwise within any practical limits without in any way affecting the proper running of the machine, and this without attention on the part of the operator. By taking off the head 6 access may be had to the parts of the bearing, and the whole be removed from the under side of the base without disturbing the turbine other than to block-up the wheels to relieve the weight on the bearings, or in those cases where considerable latitude of adjustment is provided the screw 9 may be lowered until a collar or other part rests on top of the housing. In the latter case it will be unnecessary to open the turbine casing, everything being done from below.

The importance of the lubricating features should not be overlooked because if the fluid film between bearing blocks fails even momentarily the blocks will be seriously scarred, and if permitted to run for any considerable time will be ruined. Further, any considerable wear on the blocks means rubbing of the sharpened edges of the buckets or other parts. This condition of affairs is brought about by reason of the great weight of the moving parts and their relatively high speed.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, a guide-bearing adapted to surround a shaft, a second bearing adapted to receive the weight or thrust of the shaft, a divided holder in which both of the bearings are mounted, which holder incloses an end of the shaft and has bearing surfaces on different parts thereof, a housing for the holder that restrains it against lateral movement and is provided with separate seats for said surfaces, means for supplying lubricant to the bearings within the holder, and a device for adjusting the holder longitudinally in the housing.

2. In combination, a divided holder which incloses an end of a shaft and is provided with spherical surfaced portions, a guide-bearing adapted to surround the shaft which is mounted in one part of the holder, a second bearing adapted to receive the weight or thrust of the shaft which is mounted in the other part of the holder, a housing for the holder, a spherical surfaced seat carried by the housing that restrains the holder against lateral movement, a separate spherical surfaced seat also carried by the housing that engages one end of the holder, the radius of curvature of the second seat being greater than that of the first seat, a removable head on the end of the housing adjacent the end of the shaft, and a screw carried by said head for supporting and adjusting the last named seat and the holder.

3. In combination, a housing, a holder mounted therein, spherical seats for the holder that have the same center and restrain the holder in planes perpendicular to each other, step-and-guide bearings mounted in the holder, and means for supplying lubricant under pressure to the bearings.

4. In combination, a housing, a holder located therein, spherical surfaced seats for the holder that are supported by the housing and restrain the same in planes perpendicular to each other, a parallel guide bearing and a flat surfaced step-bearing mounted in the holder, and means for distributing lubricant in multiple to one of the spherical surfaced seats and the flat-surfaced step-bearing.

5. In combination, a housing having a cylindrical bore, a seat mounted therein and having a spherical inner surface, a member having an enlargement which snugly fits said surface, a second member which is secured to the first and is provided with a spherical under surface and a flat upper surface, a flat surfaced step coöperating with the said flat surface, a spherical surfaced block which supports the second member, and means supplying lubricant to the center of the surfaces of said second member and its coöperating parts to flow outwardly over said surfaces.

6. In combination, a housing, a holder mounted therein and comprising a tubular member and a cup-shaped member affixed thereto, a step-bearing block secured to the end of a shaft, said block being of larger diameter than the shaft and mounted within the cup-shaped member, a spherical surfaced block carried by the housing for sustaining the cup-shaped member, a guide bearing mounted in the tubular member, and a removable head for the lower end of the housing, the dimensions of the parts being such that the holder and blocks can be removed from the shaft when the head is removed.

7. In a combined step and guide bearing for the end of an upright shaft, the combination of a divided holder having a cylindrical upper member provided with an outer spherical surfaced portion about midway its length, a guide bearing mounted in said member, a lower member secured to the end of the upper member of the holder, the bottom surface of the lower member being struck from the same center as the surface of the spherical portion of the upper member, there being a recess in the upper part of the lower member provided with a step bearing seat, a bearing block carried by the lower end of the shaft that engages said seat, a housing for the bearing that has a seat that engages the spherical portion of the upper member and another seat that engages the spherical surface of the lower member and supports the holder, there being a centrally arranged lubricant chamber in the step bearing and another in the bearing that supports the holder and a passage connecting said chambers, and means supplying lubricant under pressure to the second chamber from which it passes to the first chamber and thence outwardly between the surfaces of the step bearing to the guide bearing.

8. In combination, a housing, a holder mounted therein which envelops the end of the shaft to be supported and restrains it against movement in planes perpendicular to each other, a guide bearing and a step bearing mounted in the holder, a spherical surfaced block that engages one end of the holder, and means for supplying lubricant under pressure to the opposed surfaces of the holder and block and to the two bearings in series.

9. In combination, a housing, a holder located therein, step-and-guide-bearings located in the holder, spherical surfaced seats for restraining the holder, a conduit which supplies lubricant under pressure to one of the seats and to the step-bearing, the exhaust from the latter flowing through the guide-bearing and thence to the other seat, and a drain that receives all of the exhaust lubricant.

10. In combination, a housing, a shaft having one end located within the housing, a step-bearing block on the end of the shaft that is of larger diameter than said end, a holder having an upper portion provided with a guide bearing for the shaft which is arranged above the block and a lower portion secured to the upper portion and provided with a bearing for the step-bearing block, a second step-bearing block mounted in the housing for supporting the lower portion of the holder, a side-bearing block for the upper portion of the holder which is slidably mounted in the housing, there being spherical bearing surfaces between the portions of the holder and their bearing blocks, a removable head for the lower end of the housing that supports the second step-bearing block and permits the holder and all of the blocks to be removed from the lower side of the housing, and means carried by the head for adjusting the holder and bearings.

In witness whereof, I have hereunto set my hand this twenty-fifth day of June, 1907.

JOHN G. CALLAN.

Witnesses:
 John A. McManus, Jr.,
 Charles A. Barnard.